UNITED STATES PATENT OFFICE.

ABRAHAM LANGE, OF CHICAGO, ILLINOIS.

MEDICAL COMPOUND.

SPECIFICATION forming part of Letters Patent No. 241,144, dated May 10, 1881.

Application filed May 17, 1880. (Specimens.)

*To all whom it may concern:*

Be it known that I, ABRAHAM LANGE, of Chicago, in the county of Cook and State of Illinois, have invented certain new and useful Improvements in Medical Compounds; and I do hereby declare that the following is a full, clear, and exact description of the invention, which will enable others skilled in the art to which it appertains to make and use the same.

My invention or discovery has relation to fluid medical compounds or mixtures for the alleviation and ultimate cure of affections of the chest and lungs; and it consists in a decoction of several herbs, some of which have not, to my knowledge, been used in medicine prior to my discovery of their therapeutic qualities, substantially as hereinafter more fully set forth.

To prepare this compound or mixture, I take the leaves of Indian hemp, (*Apocynum cannabinum,*) one-half ounce; of the dried root of spikenard, (*Aralia racemosa,*) one ounce; of blackberry-root, (*Rubus villosus,*) one ounce; of mullein-leaves, (*Verbascum,*) four ounces; of mountain horehound, (*Ballota nigra,*) three ounces; of common horehound, (*Marrubium vulgare,*) two ounces; of horse-mint, (*Monarda,*) three ounces; of dittany, (*Cunila mariana,*) two ounces; of dewberry-root, (*Rubus Canadensis,*) eight ounces; of galanga, (*Cyperus,*) two ounces; of smartweed, (*Polygonum hydropiper,*) two ounces; of American pennyroyal, (*Hedeoma pulegioides,*) one-half ounce, and of extract of cole-root, (*Brassica oleracea,*) three-fourths of an ounce. I prefer to use these several herbs and roots (except where otherwise stated) in their fresh and green state; but if they cannot be so procured they may be used in a dried state. These ingredients are first placed in a large mortar and thoroughly pounded and mixed, after which the contents are poured into a boiler with one gallon of water, and allowed to boil over a slow but steady fire for about twenty-four hours, or until the quantity of clear liquid is reduced to one-half gallon. I then let it cool, strain, and add one pint of alcohol to keep it from souring, after which it is ready for bottling and use.

This medicine is administered in doses from one tea-spoonful to a table-spoonful three times a day, or oftener, if required, and, if desired, it may be mixed with a little sugar and water to render it more palatable, or a few drops of peppermint may be added. It will be found to give great relief in asthma, phthisis, and other disorders of the respiratory organs.

I claim and desire to secure by Letters Patent of the United States—

The medical compound or mixture composed of a decoction of the following ingredients: Indian hemp, spikenard, blackberry-root, mullein, mountain horehound, common horehound, horse-mint, dittany, dewberry-root, galanga, smartweed, pennyroyal, and extract of cole-root, mixed with water and alcohol in about the proportions set forth.

In testimony that I claim the foregoing as my own I have hereto affixed my signature in presence of two witnesses.

ABRAHAM LANGE.

Witnesses:
AUGUST PETERSON,
JNO. H. MADIGAN.